United States Patent

[11] 3,626,477

[72] Inventor Oscar T. Fulghum, Jr.
 Wadley, Ga.
[21] Appl. No. 872,633
[22] Filed Oct. 30, 1969
[45] Patented Dec. 7, 1971
[73] Assignee Fulghum Enterprises, Inc.
 Wadley, Ga.

[54] TIMBER SHEAR
 7 Claims, 4 Drawing Figs.
[52] U.S. Cl. .................................................. 144/34 E
[51] Int. Cl. .................................................. A01g 23/02
[50] Field of Search ........................................... 144/34 R, 3
 D, 2 Z, 309 AC, 34 E

[56] References Cited
 UNITED STATES PATENTS
3,382,899  5/1968  White .......................... 144/34 E
3,270,787  9/1966  Rehnstrom .................. 144/34
3,506,043  4/1970  Fulghum ...................... 144/34
3,364,964  1/1968  Lacey ........................... 144/34
3,450,006  6/1969  White .......................... 144/34
 FOREIGN PATENTS
1,313,995  11/1962  France ......................... 144/34

Primary Examiner—Gerald A. Dost
Attorney—Cushman, Darby & Cushman

ABSTRACT: A timber shear is provided having a main body means adapted for connection to a vehicle and including a stationary jaw and a moving cutting blade, pivotally connected to said main body means, and wherein the jaw has a tree-engageable surface means and the blade has a substantially rectilinear or straight cutting edge portion disposed at the open end of the tree receiving mouth defined by the jaw and the blade, and with the tree-engageable surface on the jaw and the straight cutting edge portion of the blade being so arranged that when a tree is disposed in the mouth and the blade is pivoted toward the jaw, there is a tendency for the tree and shear to be drawn together.

PATENTED DEC 7 1971        3,626,477
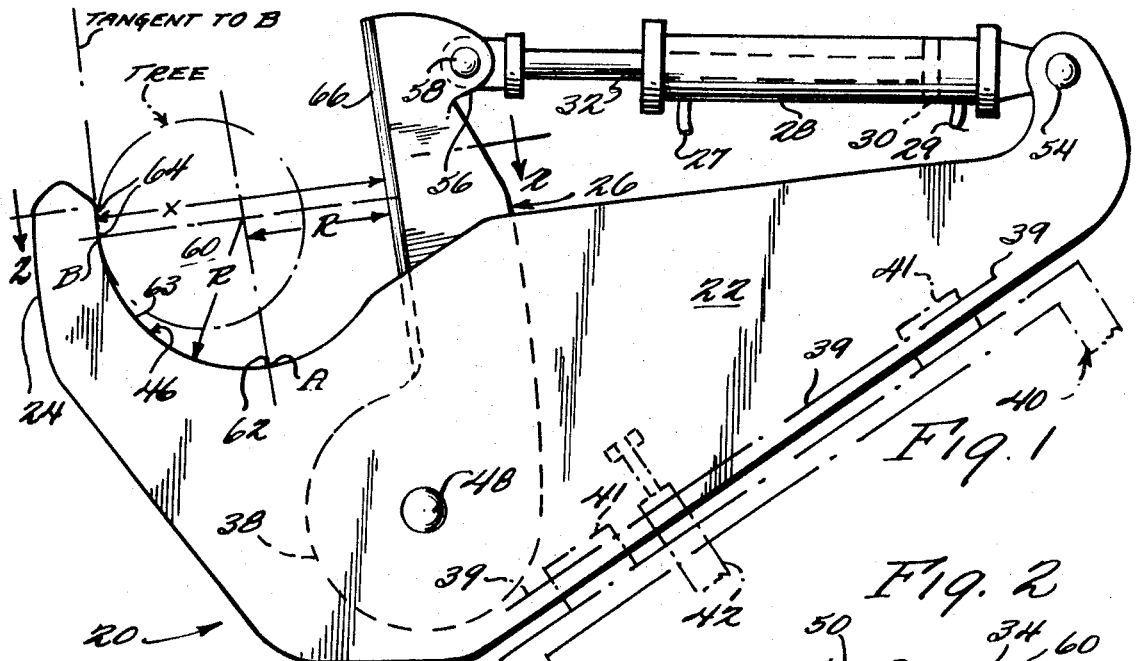
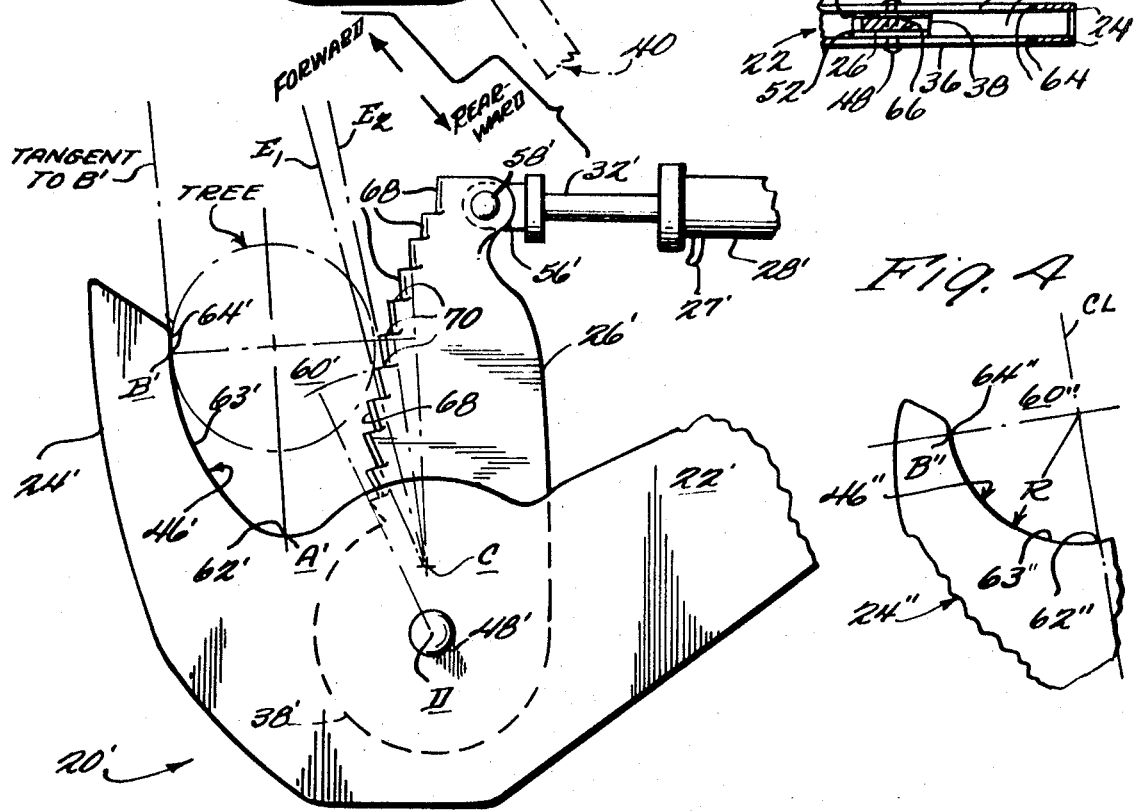
INVENTOR
OSCAR T. FULGHUM, JR.
BY
Cushman, Darby & Cushman
ATTORNEYS

TIMBER SHEAR

This invention relates to improvements in timber shears and particularly to timber shears of the type having a pivoted cutting blade and a stationary jaw member, and adapted to be connected to a vehicle, such as a tractor or skidder. The jaw member and the pivoted shearing blade define a tree-receiving mouth and the jaw member provides an anvil for the cutting action while the blade is advanced through the tree, as is understood.

The present application is an extension of my copending application Ser. No. 728,489, filed May 13, 1968, and the disclosure of that application is incorporated herein by reference.

In recent years, because of uncertainties and problems in the labor market for tree-felling operations, and because of the needs of the industry, there has been a growing demand for timber shears of the type under consideration. Various types of timber shear constructions have been proposed in the patented art, including cutting blades that reciprocate as well as pivoted blades. Prior U.S. Pat. Nos. illustrative of various proposed forms of timber shear constructions include the following: 2,565,252, 2,697,459, 2,845,101, 3,059,677, 3,183,953, 3,183,954, 3,196,911, 3,270,787, 3,294,131, 3,327,745, 3,348,592, and 3,382,899.

The present invention is directed to improvements in timber shears of the type having a main body portion for carrying a pivotally mounted cutting blade adapted to be advanced and withdrawn about a pivot axis toward and away from a stationary jaw member carried by the main body of the shear. Conventional hydraulic rams are customarily used for moving the blade, under the control of an operator in the vehicle. Shears of the type having a pivoted blade and a stationary jaw offer certain advantages both over the scissors-type shears utilizing two moveable pivoted blades and also over the reciprocating blade type, for example, in construction, operation and maintenance. However, one of the most serious drawbacks and disadvantages of the pivoted blade type timber shears, heretofore proposed, is that during felling operations substantial and undesirable reaction forces have been produced due to the fact that the scissors-type cutting action has tended to squeeze the tree out of the mouth of the shear. These reaction forces have necessitated countermeasures to keep the shear in contact with the tree during cutting operations. Such countermeasures may include application of the brakes of the vehicle or putting the vehicle in gear to continuously force the shear into the tree during cutting operations. None of these measures is considered an entirely satisfactory solution.

Accordingly, it is the primary objective of the present invention to provide a novel pivoted blade type timber shear construction, adapted to be attached to a vehicle, and designed to eliminate reaction forces, during tree-cutting operations, that would tend to push the timber shear and vehicle away from the tree being cut.

A further object is to provide a timber shear construction, of the type referred to, designed to facilitate tree felling operations, and capable of satisfactorily cutting trees of either soft wood or hard wood in a smooth, effective cutting action and with no reaction forces acting on the shear or vehicle and tending to impair the cutting operation. In fact, the cutting blade and the jaw member of the shear are so designed that when a tree, within the diameter capacity of the shear, is arranged in proper position in the moth of the shear, and the blade is actuated, forces will be set up that will not only retain the tree in the mouth of the shear but will actually tend to draw the tree and shear closer together to facilitate the cutting action.

In the illustrative embodiments invention, described hereinbelow, the tree-receiving mouth of the timber shear defined by the stationary jaw and the pivoted blade, converges from front to rear so as to provide an open front end of maximum width for receiving the trees to be cut. In one embodiment, the blade includes a straight, continuous cutting edge defining the entire cutting surface, while in another embodiment the cutting blade includes a plurality of teeth, each having a rectilinear, leading, cutting edge and of a particular geometric design and arrangement whereby during a cutting stroke, a tree placed in the mouth of the shear will be squeezed or firmly held within the shear and there will be no tendency for the tree to be squeezed out of the mouth of the shear. This latter effect is also achieved with the blade having the straight, continuous cutting edge defining the cutting surface.

The stationary jaw or anvil, at the forward or front end of the tree-receiving mouth includes a surface portion against which the tree is arranged during a cutting operation, and diametrically opposed to that surface portion on the stationary jaw the cutting blade also includes a rectilinear cutting edge, whether the blade has a continuous straight edge or is serrated including a plurality of teeth. The aforesaid surface portion of the anvil and the diametrically opposed rectilinear cutting edge of the blade are constructed and arranged so that they do not diverge in a direction outwardly or forwardly of the shear but are substantially parallel or converging in that direction, when the blade is in its normally open position, and so that they define an unobstructed opening of a width equal to or substantially equal to the maximum width of the tree receiving mouth defined by the cutting blade and the anvil.

Further objects and advantages of the invention will be in part obvious and in part pointed out from the following description and the accompanying drawing in which:

FIG. 1 is a plan view of an exemplary timber shear construction, embodying the invention, with the cutting blade shown in its normal, opened position;

FIG. 2 is vertical sectional view of the timber shear taken along line 2—2 of FIG. 1, and on a reduced scale;

FIG. 3 is a fragmentary, plan view similar to the view of FIG. 1 and illustrating another embodiment of the invention; and FIG. 4 is a fragmentary plan view of the stationary jaw of the timber shear head and illustrating another exemplary curvature for the tree engageable surface portion thereof.

Referring now to the drawing, wherein like reference characters have been used to designate like or corresponding parts, FIG. 1 illustrates a timber shear head, generally designated by numeral 20, including a main body portion 22, a stationary jaw or anvil 24, a cutting blade 26, a hydraulic cylinder 28, piston 30, and piston rod 32, arranged as shown. As disclosed in my copending application Ser. No. 728,489, the main body 22 of the shear preferably is constructed of two coextensive planar or plate members 34, 36 (see FIG. 2), spaced from one another and receiving the circular base end 38 of the cutting blade 26.

The main body 22 of the shear may be suitably mounted to a vehicle, such as a tractor or skidder (not shown), so that the entire shear 20 may be bodily lifted and lowered or tilted about a horizontal axis, for example, as indicated by numeral 39, as may be required or desired during use. Examples of suitable mounting arrangements which may be utilized are disclosed in U.S. Pat. Nos. 2,684,163, 2,986,826, 2,989,199 and in my copending application Ser. No. 733,867, filed June 3, 1968, as will be appreciated. The shear 20 preferably is mounted on the front end of the vehicle, although it will be understood that it may be mounted elsewhere on the vehicle, if desired for certain installations, applications, or uses.

In the exemplary arrangement shown in FIG. 1, a tractor or skidder front end lift arm arrangement is shown fragmentarily in phantom lines, and identified by numeral 40, suitably pivotally connected to shear head 20 as at 41 to define the horizontal pivotal axis 39, as will be appreciated. Lift arms such as 40 conventionally are pivotally connected to the tractor and double-acting hydraulic piston and cylinder means (not shown) are provided for swinging the lift arms about their horizontal pivotal axis, as disclosed for example in U.S. Pat. Nos. 2,684,163, 2,986,826 and 2,989,199, mentioned above.

Preferably, the tractor mounting means will be such that the movements of the shear will be under positive control, for example, by reason of a conventional double-acting hydraulic piston and cylinder arrangement or ram, indicated schematically at 42, and suitably connected between the body 22 and the lift arm structure 40, and operable from within the vehicle, as is understood. Ram 42 will not only permit adjusting, bodily movements of the shear head 20 about horizontal axis 39 but it will permit the shear head to beheld positively, securely and rigidly in any adjusted position, as will be appreciated.

Thus, in the preferred arrangement of the shear 20 on the front of the vehicle, the forward and rearward directions of vehicle movement are indicated by the arrows so designated in FIG. 1. The shear 20 may be retracted or lifted out of operative position to facilitate movement of the vehicle to the work site. At that time, the shear 20 will be pivoted downwardly into an operative position, as by operation of the double-acting piston and cylinder means, and it will be positively held in that position for the tree felling operation, as is understood.

Referring now more particularly to the novel shear construction in FIG. 1, it will be seen that the jaw member 24 includes a tree-engageable surface 46 thereon, and the blade 26 is pivotally connected to the plates 34, 36 for pivoting movement about the axis defined by pin or bolt 48. The structure for mounting the blade 26 for pivotable movement in the body 22 may be of the type disclosed in my copending application, Ser. No. 728,489, referred to above and including disclike bearing members 50, 52 disposed or sandwiched between base 38 and plates 34, 36, as shown in FIG. 2, and concentric with the circular base 38 about axis 48.

The cylinder 28 is shown pivotally connected to a pivot pin 54 on the body 22, and including fluid lines 27, 29. The piston rod 32 is shown as being pivotally connected to a lobe 56 on the free or outer end of the blade 26 as by pivot pin 58, in suitable manner.

Other structures (not shown) may be provided on the upper plate member 34 of the main body of the shear, for facilitating various tree handling operations, etc. as disclosed in my copending application Ser. No. 728,489, referred to above.

In the illustrative embodiment of the present invention, the surface 46 on the jaw or anvil and the cutting edge of blade 26 are shown as defining a tree-receiving mouth 60 having an open end at the front of maximum width and converging toward the rear end 62 thereof. The tree-engageable surface 46 on the stationary jaw 24 is shown as including a circularly arcuate portion 63 of radius R between points A and B, and a substantially straight portion 64 at the front end of the mouth 60. Portion 64 is shown as a smooth extension of and substantially a tangent to surface 63 at point B whereby the mouth 60 is of maximum width at its open front end and converges rearwardly toward its rear end 62. Thus, with my arrangement it will be seen that positioning of a tree in the mouth 60 will be facilitated.

The blade 26 is shown in FIG. 1 as including a straight or rectilinear continuous cutting edge 66 uninterrupted throughout its length. When the blade 26 is in its normal, open position, as shown in FIG. 1, forward extensions of the portion (or tangent) 64 of jaw 24 and edge 66 of the blade 26 will not diverge, but will be substantially parallel or converging. This is an important feature of the invention, in order to eliminate undesirable rearward-acting reaction forces on the shear during cutting operations and to produce a tendency for the tree and shear to be desirably drawn together during such cutting operations.

It will be understood that in arranging the shear so that a tree to be felled is disposed in mouth 60, the tree preferably will be arranged so as to be in engagement with the anvil or jaw 24 at about point B or on portion 64 of surface 46, for example, as indicated in phantom lines in FIG. 1.

Thus, when a tree of a diameter substantially equal to the distance X between the cutting edge 66 of the blade 26 and the point or region B on the jaw 24 is disposed in the mouth 60 of the shear in proper position, it will engage the jaw 24 and blade 26 so that a tangent drawn through the point or region of maximum pressure contact with the tree on the jaw, and an extension of the straight edge 66 of the blade 26, do not diverge in the forward direction away from the shear and vehicle, but are parallel or converging in that direction. Accordingly, when cylinder 28 is actuated and the blade 26 is moved toward the jaw 24, the cutting action will be such that the tree will actually be squeezed within the mouth 60 of the shear, and there will be a tendency to draw the tree and the shear closer together. This latter action will also occur when a tree of smaller diameter than the dimension X is arranged against point B or portion 64 of the jaw 24, as will be appreciated.

FIG. 3 illustrates another embodiment of the invention. In FIG. 3, the blade 26' is shown as including a serrated cutting edge, and the remainder of the timber shear 20' may be of similar construction to that shown in FIG. 1 (except that the shape of the surface 46' is shown modified). Hence, similar reference numerals have been used in FIG. 2 to indicate parts corresponding or similar to parts shown in FIG. 1. The shear will be suitably connected to a vehicle (not shown) as in the manner discussed above in connection with the FIG. 1 embodiment.

Referring to the cutting blade 26' shown in FIG. 3, the serrated cutting edge thereof will be seen to comprise a plurality of similarly shaped teeth, each tooth being defined by a substantially straight, or rectilinear, leading cutting edge 68, and a curved or arcuate trailing (noncutting) edge 70.

In accordance with this embodiment of the invention, the teeth of the cutting edge of the blade are formed in the following manner: each of the leading, cutting edges 68 is arranged on a radius extending from the same center, designated by the letter C in FIG. 3; and the curved trailing edges 70 of the teeth are arcs of circles of increasing radius all drawn from a center D defined on the pivot axis provided by pin 48'. Center C is disposed forwardly on the blade 26' from pivot axis 48', as shown. Thus, if each of the leading, cutting edges 68 were extended rearwardly, they would all intersect at the center C.

As shown, the leading edges 68 of the blade preferably are all of the same or substantially the same length, and the arcuate trailing sections 70, as shown, preferably are also all of the same or substantially the same length.

Thus, during a tree felling operation utilizing the blade 26' in FIG. 3, it will be seen that a squeezing action of the tree within the mouth 60' of the shear is effected when the blade is moved toward the jaw member 24' during a cutting operation. This may be understood better from a consideration of the tree shown in phantom lines in FIG. 3, in an exemplary position therein against surface 64' at about point B'. This tree would constitute a tree of substantially the maximum width of the open front end of the mouth of the shear, although it will be understood that trees of smaller size will be similarly handled, and the trees may be arranged against surface 46' at about point B' or somewhat rearwardly thereof, as desired.

When the shear 20' is placed in its operative position relative to the tree, it will be seen that a tangent drawn to the tree at its region of contact at about point B' on the jaw 24', and extensions $E_1$ and $E_2$ of the leading cutting edges 68 of the blade, closest to the tree will converge, when extended, in the forward direction (away from the shear). This has the advantageous effect of eliminating any reaction forces during the cutting stroke, tending to separate the shear from the tree, as will be evident. As the cutting stroke is effected, and more forwardly disposed cutting edges 68 enter the tree, the forces produced by these subsequently entering cutting edges will continue to hold and draw the tree and shear close together. In other words, as the blade 26' is pivoted toward jaw 24', cutting edges 68 are advanced into the tree in a direction which retains the tree against the jaw 24'.

The shear construction shown in FIG. 3 has been found satisfactory where trees of hard wood or large diameter are to be cut.

While the tree-engaging surfaces 64, 64' on the jaw member 24, 24' have been shown as smooth surfaces with no sharp interruptions or the like, it will be evident that they may be serrated, if desired. It has been found, however, that the present invention enables surfaces 46, 46', 64, 64' to be formed as smooth surfaces without any fear of having the tree squeezed out of the shear during cutting operations.

FIG. 4 is a fragmentary view of another embodiment of the stationary jaw 24 of FIG. 1 and with certain structure omitted for convenience of illustration. Double prime reference numerals indicate parts in FIG. 4 corresponding to similarly numbered parts in FIG. 1. The main difference between the jaws 24, 24'' of FIGS. 1 and 4 respectively is that the straight surface portion 64'' on jaw 24'' is of smaller length than surface portion 64 on jaw 24.

It will be appreciated that surface portion 64 (64'') may be eliminated, if desired, so that the surface 46 (46'') terminates at point B (B'') and the surface portion at that point would still come within the meaning of the term "substantially straight portion" as used herein, so long as the tangent drawn to the point of contact between the tree and surface 46 (46'') at about point B (B'') and the cutting edge 66 of the blade are substantially parallel or converge in the forward direction whereby undesirable reaction forces will be eliminated during cutting operations. Likewise, the surface portion 64' of FIG. 3, while curved and of a relatively large radius of curvature, is considered a "substantially straight surface portion" as that term is used herein.

The tips of free ends of the jaws 24, 24', 24'' are shown as being shaped to facilitate positioning of a tree within the mouth of the shear, as is evident.

Thus, it will be seen that the novel structures, configurations and arrangements of the present invention enable the objectives, mentioned above, to be realized.

What is claimed is:

1. A timber shear having a main body means adapted to be connected to a vehicle and including a stationary jaw and a movable shearing blade spaced from said jaw and in alignment therewith,
   a. said blade being pivotally connected to said main body means for movement about a pivot axis from a normal, opened position and toward said jaw during a tree-shearing stroke,
   b. said jaw having a tree-engageable surface means,
   c. said blade including a cutting edge means defining with said surface means on said jaw, a tree-receiving mouth, having an open outer end at its front and a closed inner end at its rear,
   d. said cutting edge means being defined at least partially by a substantially rectilinear cutting edge portion disposed at said open end of said mouth,
   e. said tree-engageable surface means on said jaw having a substantially straight portion at said open end of said mouth, and said rectilinear cutting edge portion of said blade being substantially diametrically opposed from said straight portion and generally parallel thereto or converging therewith in the forward direction when said blade is in its normal, open position, and
   f. said blade being so positioned relative to said surface means on said jaw that when the blade is moved to its most open position to receive the largest diameter tree acceptable to the mouth of the shear, the cutting edge portion of the blade will make, during a cutting stroke, a tangent with an initial point of contact with said tree and said tangent will form a parallel with, or a small inwardly directed acute angle with, a separate tangent formed by initial contact of the tree with the surface means on said jaw, said parallel or small acute angle being such that pivotal movement of the blade towards the jaw maintains the tree within the confines of the shear without developing any reaction forces which would force the tree away from the shear.

2. The structure defined in claim 1 wherein said cutting edge means is defined by a continuous straight edge substantially coextensive with said mouth.

3. The structure defined in claim 2 wherein said cutting edge means is defined by a plurality of teeth, each tooth having a rectilinear, leading, cutting edge and a trailing edge, said leading edges all lying on radii drawn from the same center, and said center being displaced from said pivot axis.

4. The structure defined in claim 3 wherein said center is spaced between said pivot axis and said open end of said mouth.

5. The structure defined in claim 1 wherein said tree-engageable surface means on said jaw includes a curved portion extending rearwardly and inwardly from said substantially straight portion and said mouth being of maximum width at its open outer front end and converging in width to said rear end thereof.

6. The structure defined in claim 1 wherein said cutting edge means is defined by a plurality of teeth, each tooth having a rectilinear, leading, cutting edge and a trailing edge, said leading edges all lying on radii drawn from the same center, and said center being displaced from said pivot axis.

7. A timber shear having a main body means adapted to be connected to a vehicle and including a stationary jaw and a movable shearing blade spaced from said jaw and in alignment therewith,
   a. said blade being pivotally connected to said main body means for movement about a pivot axis from a normal, opened position and toward said jaw during a tree-shearing stroke,
   b. said jaw having a tree-engageable surface means,
   c. said blade including a cutting edge means defining with said surface means on said jaw, a tree-receiving mouth, having an open outer end at its front and a closed inner end at its rear,
   d. said cutting edge means being defined at least partially by a plurality of teeth, with each tooth having a rectilinear, leading, cutting edge and a trailing edge, said leading edges all lying on radii drawn from the same center, and said center being displaced from said pivot axis,
   e. said tree-engageable surface means on said jaw having a curved portion disposed adjacent said open front end of said mouth so that when a tree is arranged in said mouth and is bearing against said curved portion a tangent to the point of contact between the tree and said curved portion will be parallel to or converging with, in the forward direction away from said mouth, a rectilinear cutting edge of a tooth making a first contact with said tree, and
   f. said blade being so positioned relative to said surface means on said jaw that when the blade is moved to its most open position to receive the largest diameter tree acceptable to the mouth of the shear, the cutting edges of the blade will make, during a cutting stroke, a tangent with an initial point of contact with said tree and said tangent will form a parallel with, or a small inwardly directed acute angle with, a separate tangent formed by initial contact of the tree with the surface means on said jaw, said parallel or small acute angle being such that pivotal movement of the blade towards the jaw maintains the tree within the confines of the shear without developing any reaction forces which would force the tree away from the shear.

* * * * *